Feb. 13, 1968      F. W. FORK      3,368,311
TRENCH ASSEMBLY WITH VERTICALLY ADJUSTABLE MEANS
Filed Feb. 28, 1966      4 Sheets-Sheet 1

INVENTOR.
FRANK W. FORK
BY
Harry B Keck
ATTORNEY

Feb. 13, 1968    F. W. FORK    3,368,311
TRENCH ASSEMBLY WITH VERTICALLY ADJUSTABLE MEANS
Filed Feb. 28, 1966    4 Sheets-Sheet 2

INVENTOR.
FRANK W. FORK
BY
Warry B. Keck
ATTORNEY

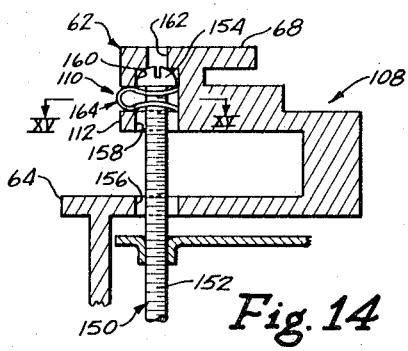
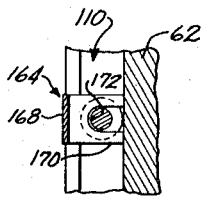
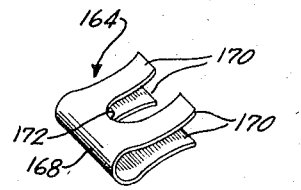
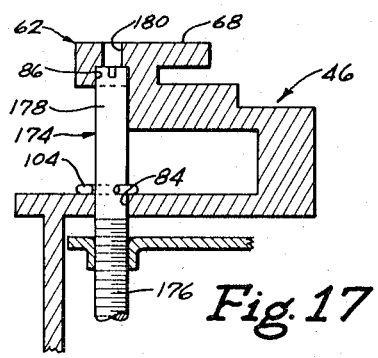
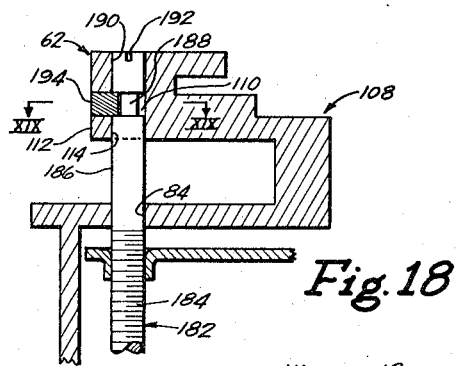
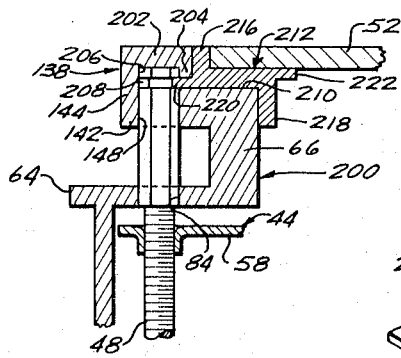
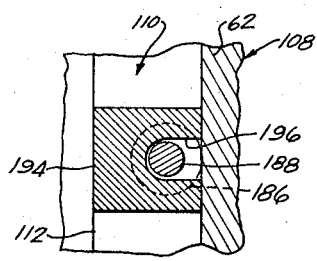
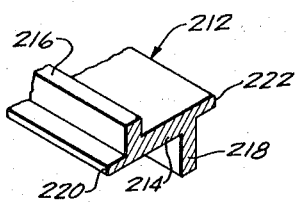
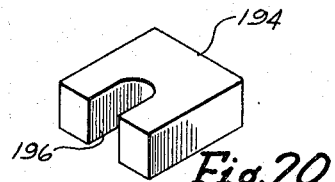
INVENTOR.
FRANK W. FORK Feb. 13, 1968  F. W. FORK  3,368,311
TRENCH ASSEMBLY WITH VERTICALLY ADJUSTABLE MEANS
Filed Feb. 28, 1966  4 Sheets-Sheet 4

INVENTOR.
FRANK W. FORK
BY
Harry B Keck
ATTORNEY

United States Patent Office 3,368,311
Patented Feb. 13, 1968

3,368,311
TRENCH ASSEMBLY WITH VERTICALLY
ADJUSTABLE MEANS
Frank W. Fork, Allison Park, Pa., assignor to H. H. Robertson Company, Pittsburgh, Pa., a corporation of Pennsylvania
Filed Feb. 28, 1966, Ser. No. 530,464
13 Claims. (Cl. 52—127)

ABSTRACT OF THE DISCLOSURE

A trench assembly including aligned abutting cover plates and vertically adjustable means for supporting the cover plate substantially flush with the intended level of a floor. The vertically adjustable means includes leveling screws which rotatably engage longitudinal members supporting the opposite edges of the cover plates and threadedly engage stationary elements positioned below the longitudinal members. The leveling screws are out of contact with the cover plates. Rotation of the leveling screws causes vertical displacement of the cover plates into substantially flush relation with the intended level of the floor.

This invention relates to a trench assembly of the type installed in a concrete floor and which is used to distribute electrical power and communication wiring, fluid-carrying conduits and the like. More particularly, the present invention relates to improvement in means for supporting and for vertically positioning cover plates associated with said trench assembly.

The present electrical trench can be installed in modern building floor constructions which utilize metal cellular flooring. As shown, for example, in U.S. Patent No. 2,445,197, metal cellular flooring conveniently provides underfloor electrical raceways. The present electrical trench cooperates with the floor cells to distribute power and communication wiring throughout the floor area. As the usage of electricity in modern buildings has increased, the need for greater electrical carrying capacity has become apparent. Similarly, the changeable character of a building's usage demands increased accessibility to electrical carrying channels to accommodate frequent alterations in the electrical utilization. The present electrical trench provides a large electrical carrying capacity and permits easy accessibility to the electrical carrying channels.

Buildings which utilize reinforced concrete as a flooring, i.e., which do not employ metal cellular flooring, require electrical wiring carrying facilities. The present electrical trench can be installed and used in such reinforced concrete flooring.

As is known, there is an inherent variation in concrete thickness associated with poured concrete flooring. That is, the concrete fill is thicker between supporting beams than in regions overlying supporting beams. The weight of the concrete creates an inherent sag between supporting beams and a corresponding increased concrete thickness. Frequently, the differential thickness of concrete is one inch and more. A differential thickness of at least one-half inch is commonplace. Horizontal surface alignment of trench elements has been difficult to accomplish.

Horizontal alignment of the present electrical trench can be readily accomplished.

As is also known, prior art trench assemblies have cover plates which may be positioned vertically to present their upper surfaces substantially flush with the intended level of the concrete floor. Such prior art trenches include, in general, a U-shaped pan having a horizontal flange along each side. A movable member, usually an extruded element or a bent sheet metal element, is positioned above each horizontal flange to support the edges of the cover plates. Leveling screws, engaged in threaded openings provided in the longitudinal flanges project upwardly into supporting engagement with the movable members. The overall arrangement is such that turning the leveling screws results in vertical displacement of the movable member and the cover plates. See my U.S. Patents 3,084,480 and 3,237,356.

Heretofore, the leveling screws have been positioned directly beneath the cover plates. This arrangement has presented some disadvantages. For example, in order to provide access to the head of the leveling screws, openings are provided in the cover plate. No other access to the leveling screws is available.

In other trench arrangements, the heads of the leveling screws are confined between the cover plate and the movable member. In this instance, the cover plates first must be loosened slightly to permit turning of the leveling screws.

In all prior art arrangements, carefully controlled drilling operations are necessary to insure registration between the access holes and the heads of the leveling screws. To circumvent or rather to ease the registration requirements, oversize access holes have been provided in the cover plates. However, when a decorative coating, such as asphalt tile, rubber tile and the like, is applied over the cover plates, the decorative coating is not supported in the areas of the oversize openings and hence is subject to possible damage when walked upon.

OBJECTS

Accordingly, as an overall object, the present invention seeks to provide a trench assembly having improved means for supporting and for vertically positioning the movable trench elements.

A further object of the invention is to provide an improved trench assembly which requires a fewer number of drilling operations to be performed during its fabrication.

Still another object of the invention is to provide an improved trench assembly wherein the leveling screws can be turned either from above the trench assembly or from the sides of the trench assembly.

A further object of the invention is to provide an improved trench assembly having leveling screws which are spaced outwardly from beneath the cover plates, thereby eliminating the access holes heretofore provided in the cover plates, avoiding any damage to the decorative coating made possible by the access holes, and completely eliminating the need for precise drilling operations previously required by the access holes.

STATEMENT OF INVENTION

The present invention provides a trench assembly of the type having generally rectangular aligned abutting cover plates and vertically adjustable means for supporting the cover plates substantially flush with the level of the floor.

In accordance with the present invention, improved vertically adjustable means is provided comprising longitudinal members, one extending along each of the opposite edges of the aligned abutting cover plates. The longitudinal members have horizontal shoulders projecting beneath the cover plates in supporting relation. Stationary elements, having threaded openings, are rigidly supported beneath each of the longitudinal members below the intended level of the floor. Leveling screws are rotatably engaged with the longitudinal members an depend therbelow into threaded engagement with the threaded openings. Each of the longitudinal members rests on a nonthreaded portion of the leveling screws. Retaining means is provided for rotatably confining the leveling screws in vertical bores provided in the longitudinal members. The overall arrangement is such that rotation of the leveling screws causes the longitudinal members to be vertically displaced, thereby supporting the cover plates in substantially flush relation with the intended level of the floor.

The present trench assembly is also provided with tile-stop elements, one carried by each of the longitudinal members. The tile-stop elements are prefrably of the reversible type having a first lip and a second lip which is longer than the first lip. The overall arrangement is such that when the first or short lip is vertically positioned, its uppermost surface terminates substantially flush with the intended level of the floor, and when the second or long lip is positioned vertically, its uppermost surface terminates above the level of the floor and serves as a floor covering or tile divider.

In the present trench assembly, the leveling screws are spaced outwardly from beneath the cover plates, that is, outboard of the sides of the cover plates. As will become apparent, this arrangement permits the leveling screws to be turned either from the sides of the trench assembly or from the top of the trench assembly. Furthermore, the access holes heretofore provided in the cover plates, have been eliminated along with the precise drilling operations associated therewith.

The above and other objects and advantages of the present invention will become apparent from the following detailed description by reference to the accompanying drawings, in which:

FIGURE 14 is a cross-sectional view, similar to FIGURE 6, illustrating a leveling screw arrangement employing a spring clip element;

FIGURE 15 is a cross-sectional view taken along the line XV—XV of FIGURE 14;

FIGURE 16 is an isometric view of the spring clip element employed in the arrangement of FIGURE 14;

FIGURE 17 is a cross-sectional view, similar to FIGURE 9, illustrating a further alternative leveling screw arrangement;

FIGURE 18 is a cross-sectional view, similar to FIGURE 14, illustrating a further alternative leveling screw arrangement employing wedge members as the retaining means;

FIGURE 19 is a cross-sectional view, taken along the line XIX—XIX of FIGURE 18, further illustrating the wedge members;

FIGURE 20 is an isometric view of the wedge members employed in the embodiment of FIGURE 18;

FIGURE 21 is a cross-sectional view, similar to FIG-9, illustrating a further alternative embodiment of the retaining means;

FIGURE 22 is a fragmentary isometric view illustrating a reversible tile-stop element used in the embodiment of FIGURE 21;

GENERAL DESCRIPTION

Figure 1:
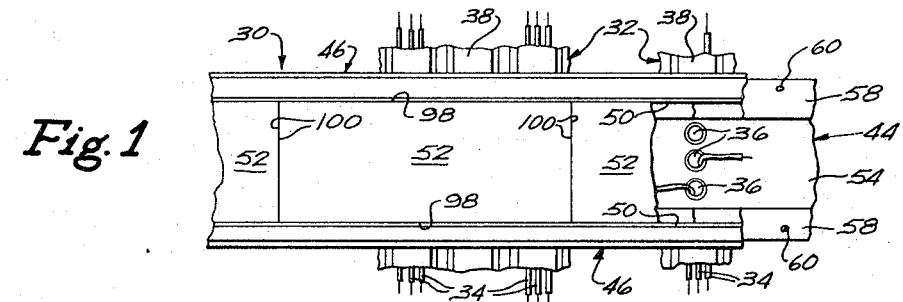
FIGURE 1 is a fragmentary plan view of the present trench assembly installed above conventional metal cellular flooring.

Reference is now directed to FIGURE 1 wherein the present electrical trench, generally indicated by the numeral 30, is shown in a preferred environment in association with metal cellular flooring 32. The metal cellular flooring 32 serves as conduits for electrical cables 34. The electrical trench 30 serves as a major feeding conduit for electrical cables which pass through corresponding openings 36 in the base of the trench and the upper surfaces 38 of the metal cellular flooring 32. Concrete 40 (FIGURE 5) is poured above the upper surfaces 38 of the metal cellular flooring 32 to serve as a rigid floor for the resulting building. Normally, a decorative coating 42 (FIGURE 5) is provided above the concrete 40, for example, linoleum, asphalt tile, rubber tile, ceramic tile, carpeting and the like.

Figure 5:
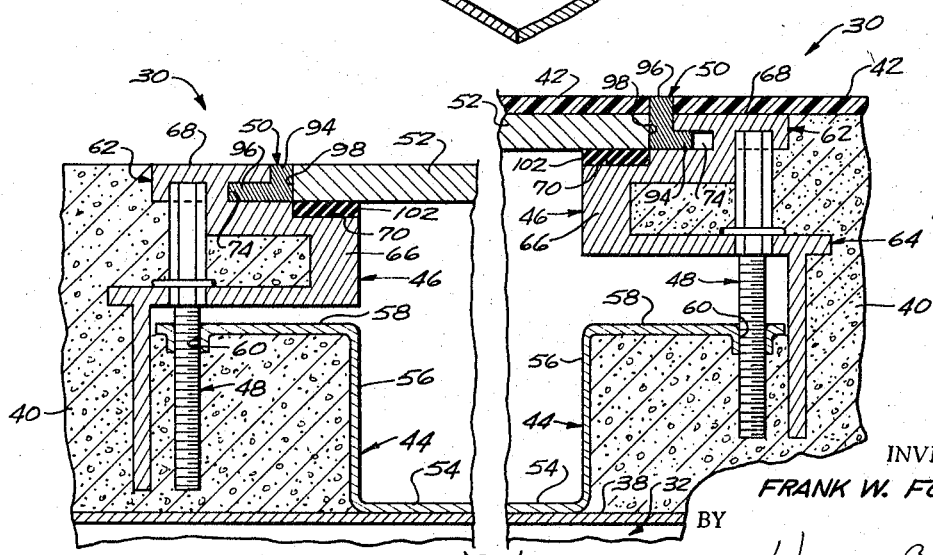
FIGURE 5 is a fragmentary cross-sectional view, taken transversely through the present trench assembly and illustrating the manner of adapting the present trench assembly to different thicknesses of floor finishing materials.

As can best be seen in FIGURES 1 and 5, the present electrical trench 30 comprises an essentially U-shaped channel 44, a pair of longitudinal members 46, a plurality of leveling screws 48, a pair of tile-stop elements 50, and a plurality of cover plates 52.

CHANNEL 44

The U-shaped channel 44 has a horizontal web 54 which rests upon the upper surfaces 38 of the metal cellular flooring 32. Vertical leg members 56 extend from the edges of the horizontal web 54 and terminate in generally horizontal flanges 58. A plurality of spaced threaded openings 60 is provided in the horizontal flanges 58 for threadedly receiving the leveling screws 48. The U-shaped channel 44 preferably is formed from metal such as steel sheet of thickness from about 12 gauge to about 24 gauge.

LONGITUDINAL MEMBERS 46

Figure 2:
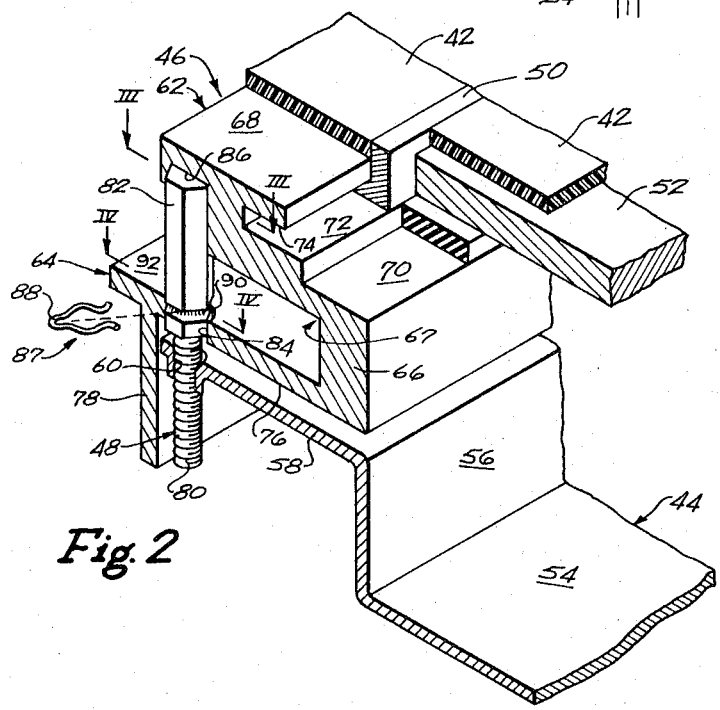
FIGURE 2 is a fragmentary isometric view of one side of the present trench assembling, illustrating the preferred arrangement of the leveling screws.

The longitudinal members 46 are illustrated in detail in FIGURE 2. The longitudinal members 46 have a generally C-shaped configuration comprising an upper horizontal arm portion 62, a lower horizontal arm portion 64, and a vertical web 66 connecting corresponding inner ends of the upper and lower horizontal arm portions 62, 64. The upper and lower horizontal arm portions 62, 64 and the vertical web 66 define a lengthwise horizontal groove 67. The upper horizontal arm portion 62 has a top face 68 which is to be positioned substantially flush with the intended level of the floor finishing material (concrete 40). The longitudinal members 46 are extruded, preferably from aluminum.

A first horizontal shoulder 70 is provided in the upper horizontal arm portion 62 at the inboard edge of the longitudinal member 46 and above the vertical web 66. The first horizontal shoulder 70 is disposed below the top face 68 and hence below the intended level of the floor finishing material. The first horizontal shoulder 70 is positioned to receive and support one side of the cover plates 52 such that the upper surfaces of the cover plates 52 are substantially flush with the top face 68.

A second horizontal shoulder 72 is provided in the upper arm portion 62 at a level between the top face 68 and the first horizontal shoulder 70. A horizontal recess 74 is provided in the upper arm portion 62. The horizontal recess 74 has a lower face substantially flush with the second horizontal shoulder 72. As will be more fully described, and as shown in FIGURE 2, the second horizontal shoulder 72 and the horizontal recess 74 are adapted to receive one of the tile-stop elements 50.

The lower horizontal arm portion 64 has a lower face 76 and is provided with a vertical flange 78 depending downwardly from the lower face 76 past the outer edge of the horizontal flange 58 of the U-shaped channel 44. The vertical flange 78 prevents the entry of wet poured concrete into the interior of the U-shaped channel 44.

LEVELING SCREWS

Figure 3:
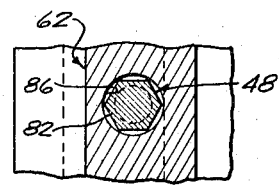
FIGURE 3 is a cross-sectional view taken along the line III—III of FIGURE 2.
Figure 4:
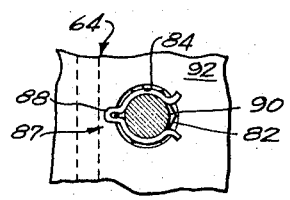
FIGURE 4 is a cross-sectional view taken along the line IV—IV of FIGURE 2.

Reference is now directed to FIGURES 2, 3 and 4 wherein the preferred embodiment of the leveling screws 48 is illustrated. As can be seen, the leveling screws 48 comprise a threaded end 80 which is threadedly engaged in the threaded openings 60 and an unthreaded end 82 which projects vertically into the longitudinal member 46. The unthreaded end 82 projects through a clearance opening 84 which is provided in the lower horizontal arm portion 64 and projects into a circular recess 86 which is provided in the upper horizontal arm portion 62. Inasmuch as the clearance opening 84 and the circular recess 86 are formed by one drilling operation, they cooperate to provide a vertical bore which receives the unthreaded end 82 of the leveling screw 48. The inner diameter of the clearance openings 84 and the circular recess 86 and the outer dimension of the unthreaded end 82 are such that the leveling screw 48 is freely rotatable in the opening 84 and recess 86 but excessive wobbling is prevented.

The unthreaded end 82 has a polygonal configuration, preferably hexagonal, whereby the leveling screw 48 may be rotated by means of a wrench inserted through the open end of the length-wise horizontal groove 67. It should also be evident that when the floor filling material (concrete 40) has hardened about the unthreaded end 82, the leveling screw 48 is rigidly embedded.

RETAINING MEANS 87

Referring now in particular to FIGURES 2 and 4, retaining means 87 is provided for retaining the leveling screws in the vertical bores such that the longitudinal members 46 are prevented from being vertically disengaged from the leveling screws 48. The retaining means 87 preferably comprises a conventional spring clip 88 which is received in a peripheral groove 90 which is located above and closely adjacent to a horizontal surface 92 of the lower horizontal arm portion 64. Consequently, when the spring clip 88 is engaged in the groove 90, as shown in FIGURE 4, the spring clip 88 will be rotatable with the leveling screw 48 and slidable over the horizontal surface 92. Inasmuch as the spring clip 88 projects over the horizontal surface 92, downward disengagement of the leveling screw 48 from the longitudinal member 46 is prevented.

TILE-STOP ELEMENTS 50

The tile-stop elements 50 preferably comprise that tile-stop element of the type disclosed and claimed in my copending application Ser. No. 312,708, filed Sept. 30, 1963. However, for the purposes of the present invention, it is believed sufficient to state that the tile-stop elements 50 have an L-shaped configuration and include a first lip 94 and a second lip 96. The first lip 94 is shorter than the second lip 96. The overall arrangement is such that in a first position, the tile-stop element is flush with the top face 68 of the longitudinal element 46 and therefore does not interfere with the leveling of the concrete 40; and in a second position, a tile-stop element project above the level of the concrete 40 and serves as a floor covering divider. As can be seen in the left-half of FIGURE 5, the second lip 96 is energized in the horizontal recess 74 and the first lip 94 projects vertically whereby its uppermost surface is substantially flush with the top of the face 68 of the upper horizontal arm portion 64. When the tile-stop element 50 is reversed, that is, rotated about its longitudinal axis, it may be positioned as shown in the right-half of FIGURE 5. In this position, the first lip 94 is engaged in the horizontal recess 74 and the second lip 96 projects above the level of the top face 68 and serves as a floor covering divider.

COVER PLATES 52

The cover plates 52 are generally rectangular having side edges 98 and abutting edges 100. The side edges 98 are fitted between the tile-stop elements 50 in covering relation to the horizontal web 54 of the U-shaped channel 44. A gasket 102 overlies the first horizontal shoulder 70 and is engaged by the cover plate 52. The gasket 102 prevents ingress of fluids into the interior of the trench assembly 30, and resiliently absorbs the sound of impacts on the cover plates, such as the sounds of walking.

VERTICAL ADJUSTMENT

The present electrical trench assembly 30 can be readily adjusted to correspond to different thicknesses of concrete, as shown in FIGURE 5. In the left-half of FIGURE 5, one thickness of concrete 40 is shown. The trench assembly 30 is shown prior to affixation of the decorative floor covering 42. Inasmuch as the trench assembly 30 has a smooth, projection-free upper face, the concrete 40 can be trowelled or otherwise made flush with the upper face of the trench assembly 30. Furthermore, in its vertically adjusted position, the trench assembly 30 defines the level of the floor above the metal cellular floor 32 and hence the thickness of the concrete 40.

In the right-half of FIGURE 5, the trench assembly 30 is shown embedded in a thicker layer of concrete 40. Vertical displacement of the longitudinal members 46 and the cover plates 52 is accomplished by rotating the leveling screws 48 in the appropriate direction. The tile-stop element 50 has its second lip 96 vertically disposed and serving as a divider for the decorative coating 42.

ALTERNATIVE EMBODIMENTS

Numerous alternative embodiments of the leveling screws, of the retaining means and of their arrangement will now be described with reference to FIGURES 6–19, inclusive. Corresponding numerals will be employed to identify corresponding parts described above.

Figure 6:
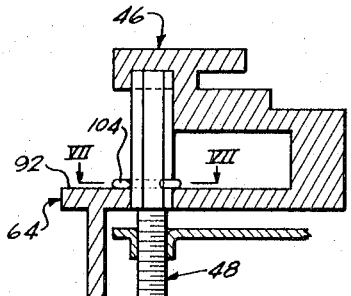
FIGURE 6 is a fragmentary cross-sectional view of one side of the present trench assembly, illustrating an alternative arrangement of the leveling screws.
Figure 7:
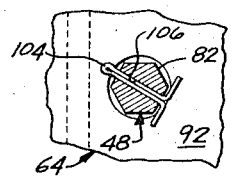
FIGURE 7 is a cross-sectional view taken along the line VII—VII of FIGURE 6, illustrating means for rotatably confining the leveling screws.

An alternative embodiment of the retaining means is illustrated in FIGURES 6 and 7 and comprises a conventional cotter pin 104 inserted through an aperture 106 extending transversely through the unthreaded end 82 of the leveling screw 48. The head and projecting ends of the cotter pin 104 are slideably engaged with the horizontal surface 92 of the lower horizontal arm portion 64. Again, disengagement of the longitudinal member 46 from the leveling screw 48 is prevented.

Figure 8:
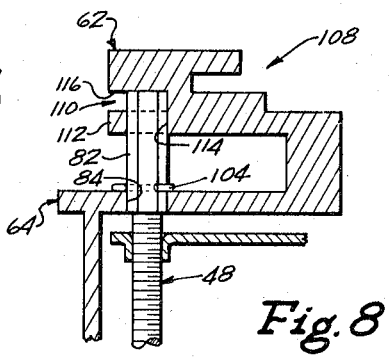
FIGURE 8 is a cross-sectional view, similar to FIGURE 6, illustrating a further alternative arrangement of the leveling screws.

An alternative embodiment of the longitudinal member is illustrated in FIGURE 8 and identified generally by the numeral 108. As shown in FIGURE 8, the longitudinal member 108 has a second lengthwise groove 110 defined by the upper horizontal arm portion 62 and a lengthwise flange 112 formed integrally with the upper horizontal arm portion 62. The lengthwise flange 112 is provided with a plurality of clearance openings 114 correspond with the clearance openings 84. The clearance openings 84 and 114 can be formed in a single drilling operation. The lengthwise groove 110 provides a natural break which indicates during fabrication that the drill has penetrated the required depth. The unthreaded end 82 of the leveling screw 48 is inserted through the clearance openings 84, 114 into engagement with a horizontal surface 116 adjacent the outer edge of the upper arm portion 62.

Figure 9:
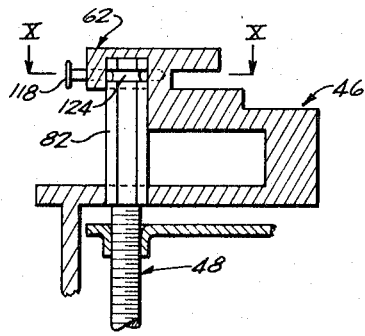
FIGURE 9 is a cross-sectional view, similar to FIGURE 6, illustrating an alternative embodiment of the retaining means.
Figure 10:
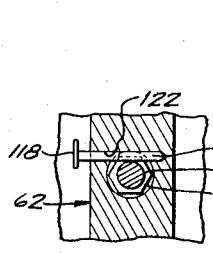
FIGURE 10 is a cross-sectional view, taken along the line X—X of FIGURE 9, further illustrating the retaining means.

A further alternative embodiment of the retaining means is illustrated in FIGURES 9 and 10 and identified generally by the numeral 118. The retaining means 118 comprises a pin 120, such as a conventional nail, inserted into a horizontal aperture 122 formed in the upper horizontal arm portion 62. The unthreaded end 82 of the leveling screw 48 is provided with a peripheral groove 124 which communicates with the horizontal aperture 122. Thus, as clearly shown in FIGURE 10, the pin 120 is connected to the upper horizontal arm portion 62 and resides in the peripheral groove 124. Consequently, the leveling screw 48 is prevented from being disengaged from the longitudinal member 46 and yet is freely rotatable to effect vertical positioning of the longitudinal member 46.

Figure 11:
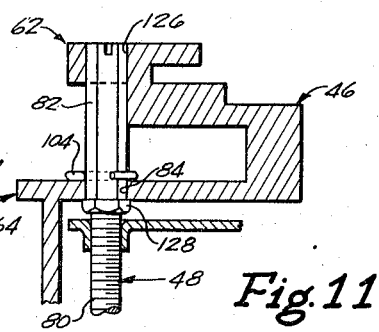
FIGURES 11, 12 and 13 are cross-sectional views, similar to FIGURE 6, and illustrating further alternative leveling screw arrangements.

A further alternative arrangement is illustrated in FIGURE 11. In this arrangement, the longitudinal member 46 is provided with the clearance opening 84 in the lower horizontal arm portion 64 and a clearance opening 126 penetrating completely through the upper horizontal portion 62. The clearance openings 84, 126 may be formed in a single drilling operation wherein the drill penetrates completely through the longitudinal member 46. A cotter pin 104 (retaining means) prevents vertical disengagement of the longitudinal member 46 from the leveling screw 48. In this embodiment, a nut 128 is threaded onto the threaded end 80 of the leveling screw 48 into frictional engagement with the unthreaded end 82. The longitudinal member 46 rests on the nut 128 and, when the leveling screw 48 is rotated, the longitudinal member 46 is displaced vertically.

Figure 12:
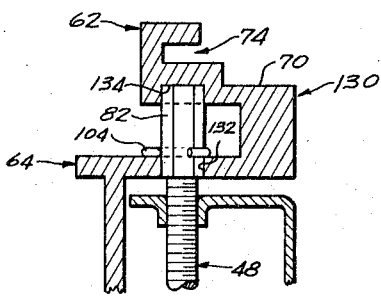

A further alternative embodiment of the longitudinal member is illustrated in FIGURE 12 and identified generally by the numeral 130. In this embodiment, the width of the longitudinal member has been reduced by approximately one third, as compared to the width of the longitudinal member 46, for example, thereby achieving a corresponding reduction in the amount of metal and the materials cost of the structure. As can be seen in FIGURE 12, the leveling screw 48 is positioned directly beneath the horizontal recess 74. The unthreaded end 82 projects through a clearance opening 132 which is provided in the lower horizontal arm portion 62 and projects into a circular recess 134 which is provided in the upper horizontal arm portion 64. The cotter pin 104 prevents disengagement of the leveling screw 48 from the longitudinal member 130. It should be noted that the leveling screw 48 is still spaced outwardly from the cover plate which would rest on the first horizontal shoulder 70.

Figure 13:
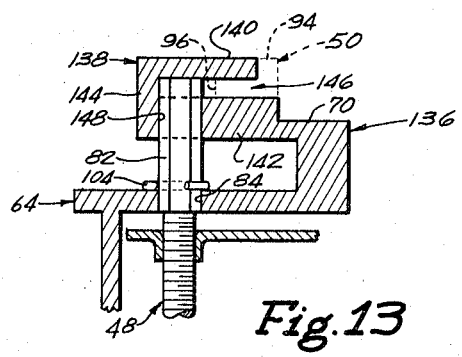

A further alternative embodiment of the longitudinal member is illustrated in FIGURE 13 and identified by the numeral 136. As can be seen in FIGURE 13, the longitudinal member 136 has a shape similar to the shape of the longitudinal member 130 (FIGURE 12). The longitudinal member 136 has a C-shaped upper arm portion 138 comprising upper and lower horizontal segments 140, 142 and a vertical web segment 144. The segments 140, 142 and 144 define a horizontal recess 146. The unthreaded end 82 of the leveling screw 48 projects through the clearance opening 84 through a clearance opening 148 provided in the lower horizontal segment 142. The clearance openings 84, 148 can be formed in a single drilling operation and the horizontal recess 146 provides a natural break which indicates during fabrication that the drill has penetrated the required depth. The horizontal recess 146 is adapted to receive either of the lips 94, 96 of the tile-stop element 50, as shown in dotted outline.

A further alternative embodiment of the leveling screws and the retaining means is illustrated in FIGURES 14, 15 and 16. As can be seen in FIGURE 14, a leveling screw 150 is provided having a threaded shaft 152 and a head portion 154 adapted to be turned by a tool. The leveling screw 150 may comprise a conventional slotted-head cap screw as shown or a conventional socket-head cap screw. In this embodiment, the longitudinal member 108 is employed. The longitudinal member 108 has clearance openings 156, 158 in the lower horizontal arm portion 64 and the horizontal flange 112, respectively, and a circular recess 160 formed in the upper horizontal arm portion 62. The openings 156, 158 and the circular recess 160 can be formed in a single drilling operation. A second opening or vertical bore 162 is drilled through the top face 68 into the circular recess 160. The head portion 154 of the leveling screw 150 resides within the circular recess 160 and the second opening 162 provides access for a screwdriver tip or similar screw-turning implement to engage the head portion 154 for rotating the same. Retaining means 164 is inserted into the second lengthwise groove 110 to rotatably confine the leveling screw 150 within the openings 156, 158 and the circular recess 160.

As can be seen in FIGURES 15 and 16, the retaining means 166 comprises a generally U-shaped spring clip member 168 having spaced arcuate arms 170 provided with vertically aligned slots 172. The spring clip member 168 is inserted into the second lengthwise groove 110 such that the threaded shaft 152 of the leveling screw 150 is received in the vertically aligned slots 172. The ends of the spaced arcuate arms 170 may be serrated to provide a firm gripping action between the arms 170 and the surfaces of the longitudinal member 108.

A further alternative embodiment of the leveling screws is illustrated in FIGURE 17 and identified by the numeral 174. As can be seen in FIGURE 17, the leveling screw 174 comprises a rod having a threaded end 176 and an unthreaded end 178. The upper portion of the unthreaded end 178 is adapted to be turned by a screw-turning tool. The unthreaded end 178 projects through the clearance opening 84 into the circular recess 86. The upper horizontal arm portion 62 is provided with a second opening or vertical bore 180 drilled through the top face 68 into the circular recess 86. The second opening 180 provides access to the upper end of the leveling screw 174. A cotter pin 104 is employed to retain the leveling screw 174 in the clearance opening 84 and the circular recess 86.

A further alternative embodiment of the leveling screws and the retaining means are illustrated in FIGURES 18 and 19 and shown therein in conjunction with the longitudinal member 108. In this embodiment a leveling screw 182 comprises a rod having a threaded end 184 and an unthreaded end 186 provided with a peripheral groove or reduced diameter portion 188 disposed in the region of the second lengthwise groove 110. The upper horizontal arm portion 62 is provided with a clearance opening 190. The clearance openings 84, 114 and 190 may be formed in a single drilling operation. The leveling screw 182 has a slotted head 192 positioned within the clearance opening 190 and thereby exposed for rotation.

Referring now to FIGURES 18, 19 and 20, the retaining means comprises a generally rectangular wedge member 194 having a vertically extending slot 196. The wedge member 194 is inserted into the second lengthwise groove 110 in a manner such that the reduced diameter portion 188 is received in the vertically extending slot 196, as best shown in FIGURE 19. The wedge member 194 is wedged into the groove 110 and serves to prevent vertical disengagement of the leveling screw 182 from the longitudinal member 108.

A further alternative embodiment of the invention is illustrated in FIGURES 21 and 22. In this embodiment, a longitudinal member 200 is employed whose configuration is similar to the configuration of the longitudinal member 138 of FIGURE 13. In this respect, the longitudinal member 200 has a C-shaped upper arm 138 including an upper horizontal segment 202, a lower horizontal segment 142 and a vertical web segment 144. The upper horizontal segment terminates along its inner edge in a downturned flange 204. The segments 142, 144, 202 and the flange 204 coopeerate to define an L-shaped lengthwise groove 206 which receives the upper end of the leveling screw 48. A peripheral groove 208 is provided in the upper end of the leveling screw 48 and resides in the lengthwise groove 206 adjacent the upper face of the lower horizontal arm segment 142. The longitudinal member 200 has a horizontal shoulder 210 at the inner edge thereof and positioned to receive a reversible tile-stop element 212.

As can best be seen in FIGURE 22, the reversible tile-stop element 212 has a central body 214 having oppositely extending first and second lips 216, 218 projecting from the opposite sides thereof. The first lip 216 is shorter than the second lip 218, the overall arrangement being such that when the first lip 216 projects vertically upward, as shown in FIGURE 21, it terminates substantially flush with the upper face of the longitudinal member 200; and, when the tile-stop element 212 is reversed, the second lip 218 projects vertically upward and terminates at a level above the upper face of the longitudinal member 200 to serve as a floor covering divider.

In accordance with the present invention, however, the tile-stop element 212 has a first horizontal lip 220 formed integrally therewith adjacent the first lip 216. As can be seen in FIGURE 21, the horizontal lip 220 projects into the lengthwisee groove 206. The width of the first horizontal lip 220 is such that the lip 220 projects into the peripheral grooves 208 of the leveling screws 48 to rotatably confine the leveling screws 48 within the clearance openings 84, 148. Consequently, the reversible tile-stop element 212 has multiple functions.

The reversible tile-stop element 212 may also be provided with a second horizontal lip 222 formed integrally therewith adjacent the second lip 218. The thickness of the second horizontal lip 222 is such that the lip 222 must be forced into the lengthwise groove 206 thereby frictionally connecting or securing the tile-stop element 212 to the longitudinal member 200. Thus when the second lip 218 is vertically positioned the tile-stop element 212 is secured to the longitudinal member and is prevented from being disengaged therefrom when the cover plates 52 are removed. Hence, damage to the edges of the decorative covering overlying the upper horizontal arm 138, is prevented.

Figure 23:
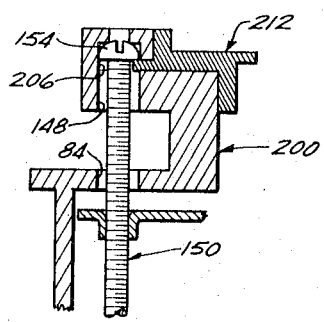
FIGURE 23 is a cross-sectional view, similar to FIGURE 21, illustrating an alternative arrangement of the embodiment of FIGURE 21.

A further alternative embodiment of the invention is illustrated in FIGURE 23 wherein the leveling screw 150 is employed in the place of the leveling screw 48 shown in FIGURE 21. In this embodiment, the slotted head 154 of the leveling screw 150 resides in the lengthwise groove 206. The horizontal lip 220 of the reversible tile-stop element 212 projects beneath the slotted head 154 and rotatably confines the leveling screw 150 within the clearance apertures 84, 148 of the longitudinal member 200.

Figure 26:
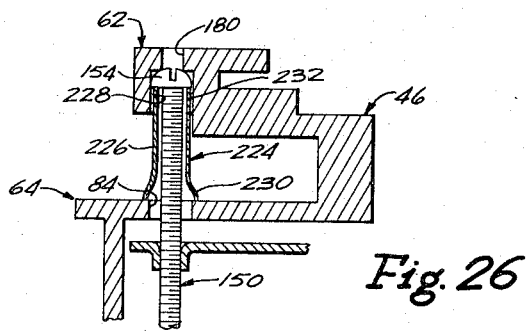
FIGURE 26 is a cross-sectional view, taken along the line XXVI—XXVI of FIGURE 25.
Figure 24:
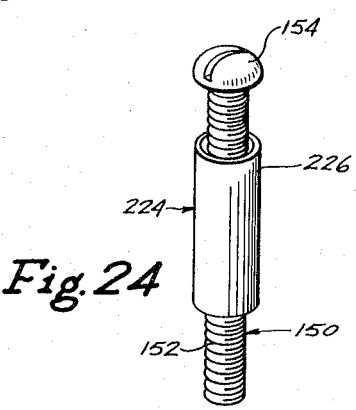
FIGURE 24 is an isometric view illustrating a leveling screw and a sleeve employed as the retaining means.
Figure 25:
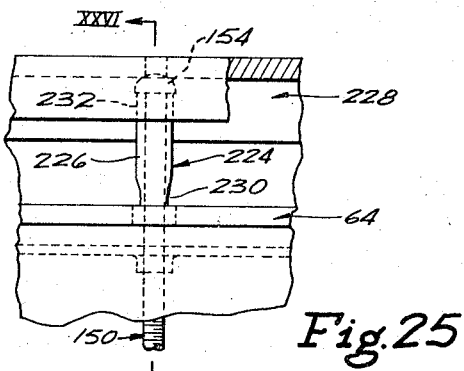
FIGURE 25 is a fragmentary side view of a longitudinal member provided with the leveling screw and sleeve of FIGURE 24.

A still further alternative embodiment of the invention is illustrated in FIGURES 24–26, inclusive. In this embodiment, the leveling screws comprise conventional fasteners shown in FIGURE 24 and heretofore identified screws 150 and including a threaded shaft 152 and a slotted head 154. Retaining means 224 comprises a sleeve 226 formed from relatively thin-gauge metal and having an outer diameter at most equal to the outer diameter of the slotted head 154 of the leveling screws 150.

As shown in FIGURES 25 and 26, the leveling screw 150 and the sleeve 226 are inserted through the clearance opening 84 and into a longitudinal recess 228 formed in the upper horizontal arm 62 of the longitudinal member 46. The second opening or vertical bore 180 provides access to the slotted head 154 for turning the leveling screw 150.

In accordance with this embodiment, the lower end 230 of the sleeve 226 is deformed or clenched, for example, by means of a pair of pliers, such that the lower end 230 now spans across and extends beyond the clearance opening 84 in the lower horizontal arm 62, as best shown in FIGURE 26. The upper end 232 of the sleeve 226 resides within the longitudinal recess 228 along with the slotted head 154 of the leveling screw 150. The overall length of the sleeeve 226 is such that the leveling screw 150 is rotatably confined within the clearance opening 84 and the longitudinal recess 228.

REINFORCED CONCRETE FLOOR STRUCTURE

Figure 27:
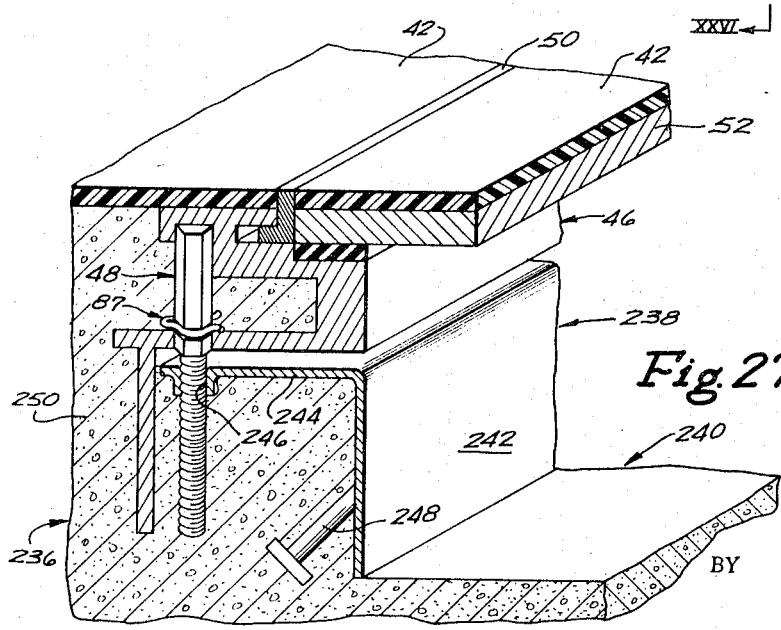
FIGURE 27 is a transverse cross-sectional view of one side of the present trench assembly, illustrating an alternative embodiment of the present trench assembly.

Reference is now directed to FIGURE 27 wherein the present trench assembly is shown installed in a reinforced concrete floor structure indicated generally by the numeral 236. In this embodiment of the present trench assembly, an L-shaped side plate 238 is employed to form a trough 240 through which the electrical wiring may be distributed. The L-shaped side plate 238 has a vertical leg 242 and a horizontal leg 244 provided with a plurality of threaded openings 246. Anchor members 248 are secured to the outer face of the vertical leg 242 and will be embedded in concrete 250 to rigidly support the L-shaped side plate 238 beneath the longitudinal member 46. The leveling screws 48 will be threadedly engaged in the threaded openings 246 and thereby support the longitudinal members 46, the tile-stop elements 50 and the cover plates 52 at the desired elevation relative to the thickness of the concrete 250.

SUMMARY

According to the foregoing description, the present trench assembly permits leveling adjustment of the cover plates without requiring that the cover plates themselves be loosened prior to making the leveling adjustments. This unique property of the present trench assembly is achieved as a result of positioning of the leveling adjustment screws outwardly beyond the edges of the cover plates in a manner which has not heretofore been presented in the trench art. A further feature of the present trench is that the longitudinal members 46 can be adjusted vertically up or down by means of the leveling screws when the cover plates are removed from the structure. Prior electrical trenches required that the cover plates be firmly in place during adjustment inasmuch as the longitudinal members 46 and the cover plates were secured together in a unitary sub-assembly which was raised or lowered as a unitary structure.

A further result of the present trench construction is that the cover plates need not be rigidly and permanently secured to the longitudinal members prior to pouring concrete since the creation of a unitary subassembly with the cover plates on the longitudinal members is not required. Accordingly the use of the present electrical trench assembly permits elimination of hold-down fasteners from the cover plates, if desired.

I claim as my invention:
1. In a trench assembly, the combination comprising:
   a generally U-shaped channel having a horizontal web, a vertical leg at each end of said horizontal web and a horizontal flange at the upper end of each said vertical leg;
   a longitudinal member supported above each said horizontal flange and including a horizontal shoulder at the inboard edge of each said longitudinal member;
   generally rectangular cover plates extending between the said longitudinal members in covering relation to the said horizontal web and engaged with the said horizontal shoulders; and means for adjustably supporting said longitudinal members including:
    leveling screws threadedly engaged with a said horizontal flange and supportingly engaged with a said longitudinal member, said leveling screws being disposed laterally beyond the edges of the said cover plates; and
    retaining means for rotatably securing each said leveling screw to a said longitudinal member; whereby rotation of said leveling screws causes vertical displacement of each said longitudinal member relative to the subjacent said horizontal flange.

2. The trench assembly as defined in claim 1 wherein each said longitudinal member has a lengthwise horizontal groove exposing body segments of the said leveling screws.

3. The trench assembly as defined in claim 2 wherein the said body segments of the said leveling screws are shaped to be rotated by a tool inserted into the said lengthwise horizontal groove.

4. The trench assembly as defined in claim 2 wherein the said lengthwise horizontal groove is defined, in part, by a horizontal surface, and wherein the said retaining means comprise elements connected to the said body segments above the said horizontal surface.

5. The trench assembly as defined in claim 4 including nuts threaded onto the threaded portions of the said leveling screws and positioned below the said horizontal surface.

6. The trench assembly as defined in claim 1 including a linear divider strip engaged with the said horizontal shoulder; each said longitudinal member having a lengthwise groove adjacent to the said linear divider strip and extending horizontally from the said linear divider strip to expose body segments of the said leveling screws; said body segments having reduced diameter portions providing peripheral grooves residing in the said lengthwise groove; and wherein the said retaining means comprise a horizontal lip projecting from the said linear divider strip into the said longitudinal groove and the said peripheral grooves.

7. The trench assembly as defined in claim 6 wherein the said linear divider strip comprises a central body portion and oppositely extending vertical lips along the opposite sides thereof, a first of said lips being shorter than a second of said lips, whereby when the said first of said lips projects vertically upward, it terminates substantially flush with the upper surface of the said longitudinal member and when the said second of said lips projects vertically upward, it terminates at a level above the upper surface of the said longitudinal member and serves as a floor covering divider.

8. The trench assembly as defined in claim 2 wherein the said retaining means comprise a sleeve on each of said leveling screws and positioned within the said lengthwise horizontal groove, the said sleeves having upper ends adapted to support the said leveling screws and lower ends adapted to engage a lower face of the said lengthwise horizontal groove.

9. The trench assembly as defined in claim 1 wherein the said horizontal flanges each have a plurality of spaced-apart threaded apertures engaged by the said leveling screws; and each said longitudinal member has a plurality of spaced-apart vertical bores corresponding to the said threaded apertures and receiving the said leveling screws.

10. The trench assembly as defined in claim 9 wherein each said longitudinal member has a generally C-shaped configuration including an upper horizontal arm portion, a lower horizontal arm portion and a vertical web portion connecting corresponding ends of the said upper and lower horizontal arm portions; and wherein the said vertical bores penetrate through the said lower horizontal arm portion and at least partially through the said upper horizontal arm portion.

11. The trench assembly as defined in claim 9 wherein the said vertical bores penetrate through a lower face of each said longitudinal member to a level which is spaced below a top face of each said longitudinal member.

12. The trench assembly as defined in claim 11 wherein the said leveling screws have heads adapted to be turned by a tool, and wherein each said longitudinal member has a plurality of second vertical bores penetrating through the said top face to expose at least a portion of the said heads for engagement by said tool.

13. In a trench assembly for use in a building floor, said trench assembly having generally rectangular aligned abutting cover plates, and vertically adjustable means for supporting said cover plates substantially flush with the intended level of said floor, the improvement in said supporting means, comprising:
    longitudinal members extending along the opposite edges of the said aligned abutting cover plates and having horizontal shoulders disposed beneath and engaged with the said cover plates;
    stationary elements rigidly supported beneath the said longitudinal members;
    threaded openings in said stationary elements; and
    a plurality of leveling screws rotatably engaged with each of the said longitudinal members at locations outwardly spaced from the edges of the said cover plates and depending into threaded engagement with the said threaded openings, whereby rotation of the said leveling screws causes vertical displacement of the said cover plates into substantially flush relation with the intended level of the said floor.

References Cited
UNITED STATES PATENTS

| | | | |
|---|---|---|---|
| 1,988,746 | 1/1935 | Neptune | 52—679 |
| 2,224,273 | 12/1940 | Neptune | 52—679 |
| 2,930,504 | 3/1960 | Hudson | 220—3.4 |
| 3,063,471 | 11/1962 | Murray | 52—221 X |
| 3,070,252 | 12/1962 | Reiland | 220—3.4 |
| 3,074,208 | 1/1963 | Seidel | 52—221 |
| 3,084,480 | 4/1963 | Fork | 52—220 |
| 3,166,633 | 1/1965 | Guzan, Jr., et al. | 52—220 X |
| 3,204,378 | 9/1965 | Stuessel et al. | 52—221 |

HENRY C. SUTHERLAND, *Primary Examiner.*